United States Patent
Einfeld et al.

(10) Patent No.: US 10,224,771 B2
(45) Date of Patent: Mar. 5, 2019

(54) ROTOR, SYNCHRONOUS MACHINE AND HYBRID DRIVE

(71) Applicant: VOLKSWAGEN AKTIENGESELLSCHAFT, Wolfsburg (DE)

(72) Inventors: Hauke Einfeld, Kassel (DE); Rainer Helmer, Kassel (DE)

(73) Assignee: Volkswagen Aktiengesellschaft, Wolfsburg (DE)

(*) Notice: Subject to any disclaimer, the term of this patent is extended or adjusted under 35 U.S.C. 154(b) by 138 days.

(21) Appl. No.: 15/512,585

(22) PCT Filed: Sep. 8, 2015

(86) PCT No.: PCT/EP2015/070483
§ 371 (c)(1),
(2) Date: Mar. 20, 2017

(87) PCT Pub. No.: WO2016/050459
PCT Pub. Date: Apr. 7, 2016

(65) Prior Publication Data
US 2017/0324287 A1    Nov. 9, 2017

(30) Foreign Application Priority Data
Oct. 1, 2014  (DE) .................. 10 2014 219 894

(51) Int. Cl.
*H02K 1/27*  (2006.01)
*H02K 1/32*  (2006.01)

(52) U.S. Cl.
CPC ........... *H02K 1/276* (2013.01); *H02K 1/2766* (2013.01); *H02K 1/2773* (2013.01); *H02K 1/32* (2013.01);
(Continued)

(58) Field of Classification Search
CPC ........ H02K 1/27; H02K 1/2766; H02K 1/276; H02K 1/2773; H02K 2213/03; H02K 1/32; H02K 2201/03
See application file for complete search history.

(56) References Cited

U.S. PATENT DOCUMENTS 4,692,699 A * 9/1987 Brunet ............... F16C 32/0446
310/90.5
5,220,228 A   6/1993 Sibita
(Continued)

FOREIGN PATENT DOCUMENTS

CA    2021663 A1   1/1991
CN   102893499 A   1/2013
(Continued)

*Primary Examiner* — Naishadh Desai
(74) *Attorney, Agent, or Firm* — Laurence A. Greenberg; Werner H. Stemer; Ralph E. Locher

(57) ABSTRACT

Circulating currents are suppressed and thermal losses are reduced in a three-phase permanent-magnet-excited synchronous machine in a delta circuit. The machine has a stator in which, during operation, a voltage is induced by way of a magnetic field generated by magnetic poles of a rotor. A field strength of the magnetic field has, along a circumferential coordinate of the rotor, a profile formed from superimposition of a sinusoidal basic function and of sinusoidal harmonics of the basic function. Groove recesses and/or cavities are located in and/or under a circumferential face of the rotor that face the stator and follow an axial extent of the pole pitch of the rotor in their longitudinal extent and extend transversely with respect to the longitudinal extent along the circumferential coordinate in the region of the maximum values of at least the third harmonic and outside the maximum values of the basic function.

8 Claims, 3 Drawing Sheets

(52) U.S. Cl.
CPC ..... *H02K 2201/03* (2013.01); *H02K 2213/03* (2013.01)

(56) References Cited

U.S. PATENT DOCUMENTS

| | | | | |
|---|---|---|---|---|
| 6,104,117 | A | * | 8/2000 | Nakamura ............. H02K 1/148 310/156.45 |
| 2013/0093284 | A1 | * | 4/2013 | Utaka .................. H02K 1/2766 310/216.094 |

FOREIGN PATENT DOCUMENTS

| | | |
|---|---|---|
| DE | 69015911 T2 | 7/1995 |
| DE | 69726547 T2 | 11/2004 |
| DE | 102008043739 A1 | 5/2010 |
| DE | 102010013302 A1 | 10/2010 |
| JP | H08275421 A | 10/1996 |
| JP | 2009077525 | 4/2009 |

* cited by examiner

ROTOR, SYNCHRONOUS MACHINE AND HYBRID DRIVE

BACKGROUND OF THE INVENTION

Field of the Invention

The invention relates to a rotor for a three-phase permanent-magnet-excited synchronous machine. The invention also relates to a three-phase permanent-magnet-excited synchronous machine. The invention furthermore relates to a hybrid drive, in particular for a vehicle.

Prior Art

When configuring an electric machine, in particular a three-phase permanent-magnet-excited synchronous machine, preferably for a hybrid drive of a vehicle, it is found that when calculating voltages which occur in the machine and are induced by the rotor and, in particular by magnetic fields of permanent magnets used therein, the magnetic fields and therefore the induced voltages differ to a greater or lesser extent from an ideally aimed out sinusoidal shape along a circumferential coordinate of the rotor depending on the design of this machine and, in particular of a rotor of this machine. The magnetic fields and induced voltages which are actually formed can then be represented in a superimposed form according to Fourier decomposition composed of a basic function and a harmonic. The basic function, i.e. the portion of the magnetic field or voltage with an ordinal number 1 of the Fourier decomposition has here along the circumferential coordinate of the rotor a period which corresponds to a spatial extent of two adjacent opposing magnetic poles of the rotor in the circumferential coordinate, i.e. a pole pitch, i.e. a half period extends over a magnetic pole. The second harmonic, i.e. the portion of the magnetic field or voltage with the ordinal number 2 of the Fourier decomposition has, in contrast, a period which corresponds to a spatial extent of a magnetic pole of the rotor in this circumferential coordinate, i.e. a half period extends over half a magnetic pole. In the case of the third harmonic, i.e. the portion of the magnetic field or voltage with the ordinal number 3 of the Fourier decomposition, a half period then correspondingly extends over a third of the spatial extent of a magnet pole of the rotor in the circumferential coordinate. Correspondingly, in the case, for example, of the ninth harmonic, i.e. the portion of the magnetic field or voltage with the ordinal number 9 of the Fourier decomposition, a half period extends over a ninth of the spatial extent of a magnet pole of the rotor in the circumferential coordinate etc.

In the case of the three-phase permanent-magnet-excited synchronous machines which are preferably used for hybrid drives it has become apparent that the portions of the magnetic field or voltage with the ordinal numbers 3 and 9 are relatively large. When the machine is connected in a delta circuit, it is these third and ninth harmonics which actually bring about a circular current within the delta circuit, which causes thermal losses without making a contribution to the driving power of the machine.

DE 10 2010 013 302 A1 discloses an electric motor comprising a motor housing in which bearings for supporting the rotor shaft are provided, wherein a stator laminated core, on which a stator winding is arranged, is provided in the motor housing, wherein a rotor laminated core which is connected in a rotationally fixed fashion to the rotor shaft is provided in the motor housing. Recesses which run from the one axial inside of the rotor laminated core to the other axial inside of the rotor laminated core, wherein air feed means are provided inside the housing, in particular for driving an air flow within the housing, in particular in the recesses are provided on the rotor laminated core. In an alternative embodiment, the rotor laminated core has, as recesses, a plurality of slots on the circumference which are embodied in a screw-like fashion in the axial direction and have, in the circumferential direction, an angle value which increases in the axial direction. These recesses, in particular slots, are intended to improve the transportation away of heat from the rotor.

Document JP 8-275 421 A discloses helical slots on the rotor surface of an electric machine which serve to feed cooling air during the rotation of the rotor.

SUMMARY OF THE INVENTION: OBJECT, SOLUTION, ADVANTAGES

The invention has the object, in a three-phase permanent-magnet-excited synchronous machine of the type described above, of at least reducing, and preferably completely suppressing, the undesired circular current within the delta circuit with means which are, in particular, simple in terms of fabrication technology, and of thus reducing or avoiding the thermal losses which are caused thereby.

This object is achieved by means of a rotor for a three-phase permanent-magnet-excited synchronous machine which comprises a stator in which during operation, a voltage can be induced by means of a magnetic field which is generated by magnetic poles of the rotor, wherein a field strength of the magnetic field has, along a circumferential coordinate of the rotor, a profile which is formed from superimposition of a sinusoidal basic function and this period corresponds to one pole pitch of the rotor, and from sinusoidal harmonics of the basic function, wherein slot-like recesses and/or cavities, which in their longitudinal extent follow an axial extent of the pole pitch of the rotor and extend transversely with respect to their longitudinal extent along the circumferential coordinate in the region of the maximum values of at least the third harmonic and outside the region of the maximum values of the basic function, are arranged in and/or under a circumferential face, facing the stator, of the rotor.

In the rotor which is embodied according to the invention, slot-like recesses are therefore arranged in the circumferential face of the rotor facing the stator, or cavities are arranged underneath the circumferential face facing the stator. A combination, according to which both slot-like recesses and cavities are provided, is also possible. These slot-like recesses and/or cavities extend with their longitudinal extent along the axial extent of the pole pitch of the rotor. Therefore, if the magnet poles of the rotor have a straight orientation in the axial direction of the rotor and therefore of the machine, i.e. parallel to the rotational axis of the machine, the slot-like recesses and/or cavities also extend with their longitudinal extent parallel to the rotational axis. If, on the other hand, the magnet poles of the rotor are oriented counter to the axial direction of the rotor and therefore of the machine at an angle, i.e. the magnet poles run along a helical line with respect to the rotational axis of the machine, the slot-like recesses and/or cavities also extend with their longitudinal extent parallel to this helical line.

Transversely with respect to this longitudinal extent of the slot-shaped recesses and/or cavities, i.e. in the direction of the circumferential coordinate of the rotor, the slot-shaped recesses and/or cavities are arranged in the region, i.e. in the spatial region along the circumferential coordinate of the rotor, of the maximum values of at least the third harmonic and outside the region of the maximum values of the basic function. This ensures that at least the third harmonic of the magnetic field is attenuated, since a lower magnetic conductivity in the machine is formed for them as a result of the slot-shaped recesses and/or cavities. This also reduces the voltage in the machine, which is induced by this harmonic of the magnetic field, and therefore circular currents caused by this voltage, i.e. by this portion of voltage of the total voltage induced in the machine, and therefore reduces the resulting losses.

Basically, only the basic function, that is to say the magnetic field portion with the ordinal number 1 of the Fourier decomposition is relevant for the torque formation in the machine. The remaining sine functions, i.e. the harmonics with the ordinal number 2 and more, cause losses, in the case of the $3^{rd}$, $9^{th}$, $15^{th}$, $21^{st}$ etc. harmonics the specified circular currents in a delta circuit, if the machine is correspondingly connected. The relevant locations at which the slot-like recesses and/or cavities for suppressing these harmonics with the ordinal number 3, 9, 15, 21 etc. are arranged are the spatial positions of the maximum values, also denoted as amplitudes, of these harmonics which are to be suppressed, along the circumferential coordinate of the rotor.

It can basically be provided to provide a slot-like recess and/or a cavity in the circumferential face, facing the stator, of the rotor and/or underneath said circumferential face in the rotor, at all the locations of the amplitudes of the harmonics with the ordinal numbers 3, 9, 15, 21 etc. However, it should be noted here that destruction of the profile of the basic function of the magnetic field attenuates the portion of the magnetic field which can be used to form toque, but this is undesired. Given this specific embodiment of the slot-like recesses and/or cavities, the number and configuration, e.g. the cross section and dimensions, of the slot-like recesses and/or cavities, which are arranged in or under the circumferential face, facing the stator, of the rotor, can be determined individually on the basis of simple trials or variations of a simulation calculation. In this context, the value of the amplitudes of the harmonics which are to be suppressed can also be included in the dimensioning of the slot-like recesses and/or of the cavities. With this dimensioning, which is to be performed separately in each individual case, compensation has to be performed between, on the one hand, the suppression of the undesired harmonics and, on the other hand, the requirement to leave the basic function as far as possible unaffected.

As a result, the slot-like recesses and/or cavities are provided at least at these locations in and/or under the circumferential face of the rotor at which the maximum value of the third harmonic occurs, wherein at the same time it has to be ensured that the basic function is not adversely affected, or is adversely affected only to a minimum degree. With this configuration, the undesired harmonics of the magnetic field can be effectively reduced. Correspondingly, excitation of circular currents in the machine operated in a delta circuit is reduced. The sine-wave shape of the profile of the magnetic field is therefore improved.

The invention makes it possible to use simple structural and technical fabrication means to effectively suppress disruptive, i.e. loss-generating, harmonics of the profile of the magnetic field in the machine along the circumferential coordinate of the rotor. In contrast with this, a possibility of configuring the circumferential face of the rotor in an approximately sinusoidal shape in the direction of the circumferential coordinate so that a smaller air gap is produced towards the stator in the center of the pole than in pole gaps, is more complicated and more costly in terms of fabrication technology.

Introducing slot-like recesses into the circumferential face of the rotor of the machine is simpler to manufacture compared with an approximately sinusoidal configuration of the circumferential face of the rotor. Furthermore, the position along the circumferential coordinate, the configuration, in particular the cross section, and the number of slots can easily be individually adapted to the corresponding needs of each machine design and set of machine dimensions. If, for example, a strong third harmonic arises but no ninth, with respect to the position and configuration of the slot-like recesses, it is possible to refer merely to the locations which are relevant for the third harmonic, i.e. the locations at which the maximum values thereof occur. In a comparable way, the introduction of cavities into the rotor underneath the circumferential face of the rotor of the machine is simpler than the specified, approximately sinusoidal, configuration of the circumferential face of the rotor, in particular by virtue of the fact that simple cross-sectional shapes can be selected for the cavities.

By virtue of the invention, machines of the abovementioned type can be operated with low losses both in a star circuit and in a delta circuit.

Advantageous refinements of the invention are characterized in the dependent claims.

According to one preferred development of the rotor according to the invention, the slot-like recesses and/or cavities which in their longitudinal extent follow the axial extent of the pole pitch of the rotor in the circumferential face facing the stator, of the rotor, are arranged extending transversely with respect to their longitudinal extent along the circumferential coordinate in the region of the maximum values of at least the third harmonic and additionally at least the ninth harmonic and/or the fifteenth harmonic and/or the twenty-first harmonic and outside the region of the maximum values of the basic function.

In this development the slot-like recesses and/or cavities are arranged transversely with respect to their longitudinal extent, i.e. in the direction of the circumferential coordinate of the rotor, in the spatial region of the maximum values, extending along the circumferential coordinate of the rotor, not only the third harmonic, but also the spatial regions in which optionally the maximum values of the ninth and/or the fifteenth and/or of the twenty-first harmonic, and also further even higher harmonics lie, are also taken into account for the arrangement of the slot-like recesses and/or cavities. It is also to be noted here that the slot-like recesses and/or cavities are to be arranged outside the region of the maximum values of the basic function in order to avoid attenuation of the basic function.

This ensures that, in addition to the third harmonic of the magnetic field, the ninth, fifteenth, twenty-first etc. harmonic is also optionally attenuated, since a lower magnetic conductivity is also formed for them in the machine as a result of the slot-like recesses and/or cavities. As a result, the voltage portions which are induced by these harmonics of the magnetic field in the machine are also reduced, and therefore circular currents caused by these voltage portions of the total voltage induced in the machine, and therefore the losses caused thereby, are also reduced. This development can preferably be used in cases in which the higher harmonics still have appreciable amplitudes. However, in customary machines the amplitude of the harmonics decrease as the ordinal number rises.

In a further preferred embodiment of the rotor according to the invention, the circumferential face of the rotor is configured in such a way that an air gap between the circumferential face and a face of the stator lying opposite the latter is formed at least in a virtually constant fashion along the circumferential coordinate of the rotor outside the extent of the slot-like recesses. Therefore, a cost-effective embodiment of the rotor, which is simple in terms of structure and fabrication technology is obtained.

There is preferably provision for the slot-like recesses to be manufactured from the outset when the rotor is fabricated. However, it is also additionally possible to form the slot-like recesses only after the termination of the fabrication of the machine in the course of an individual adjustment of each individual example of the fabricated machines. This may be done for example by milling, grinding or the like.

In a further advantageous refinement of the rotor according to the invention, the cavities which in their longitudinal extent follow the axial extent of the pole pitch of the rotor under the circumferential face, facing the stator, of the rotor are embodied as cavities which are at least virtually completely closed off transversely with respect to their longitudinal extent. Here, the term cavity expresses the fact that this refinement of the invention preferably involves cavities which are closed or at least virtually closed and are configured, particularly preferably in a channel-like or tube-like fashion and are arranged separately from possible further cavities within the rotor, e.g. the recesses which are known from the prior art, provided on the rotor laminated core, run from the one axial inside of the rotor laminated core to the other axial inside of the rotor laminated core and serve to conduct cooling air. This configuration can then be performed at least largely independently of other configuration features or configuration elements of the rotor.

According to another advantageous refinement of the rotor according to the invention, the cavities which in their longitudinal extent follow the axial extent of the pole pitch of the rotor, under the circumferential face facing the stator, are embodied as slot-like pockets in a wall of at least one magnet pocket of the rotor. Therefore, it is possible to simplify the configuration of the rotor, for example simplify a rotor plate section, compared to a configuration with separately arranged cavities which are closed in themselves or at least virtually closed, as a result of which punching tools, which are to be used, in particular, for fabrication, can be simplified and therefore manufactured more cost-effectively. This configuration makes use of the fact that the position of the magnet pockets of a, for example, permanent-magnet-excited rotor is correlated directly with the profile of the magnet fields or induced voltages along the circumferential coordinate and therefore specific spatial assignments of the magnet pockets to the cavities are provided.

There is also preferably provision for the cavities, i.e. cavities and/or pockets, to be manufactured from the outset during the fabrication of the rotor. However, it is additionally also possible to provide the cavities, i.e. cavities and/or pockets, only after the conclusion of the fabrication of the machine in the course of an individual adjustment of each individual example of the fabricated machines. This can be done, for example, by drilling or the like.

The above-mentioned object is also achieved by means of a three-phase permanent-magnet-excited synchronous machine which is characterized by a rotor of the type described above. The machine embodied in such a way, in particular, also during operation in a delta circuit, i.e. preferably in the case of a high load, an improved efficiency and reduced losses, as a result of which the thermal loading of the machine is reduced and the utilization of energy improved. This is particularly advantageous for use of the machine in electrically operated vehicles.

Accordingly, the abovementioned object is advantageously also achieved by means of a hybrid drive, in particular for a vehicle, having such a three-phase permanent-magnet-excited synchronous machine.

BRIEF DESCRIPTION OF THE DRAWINGS

Exemplary embodiments of the invention are illustrated in the drawing and will be described in detail below, wherein corresponding elements in all the figures are provided with the same reference symbols, and a repeated description of these elements will not be given. In the drawing.

PREFERRED EMBODIMENT OF THE INVENTION

Figure 1:
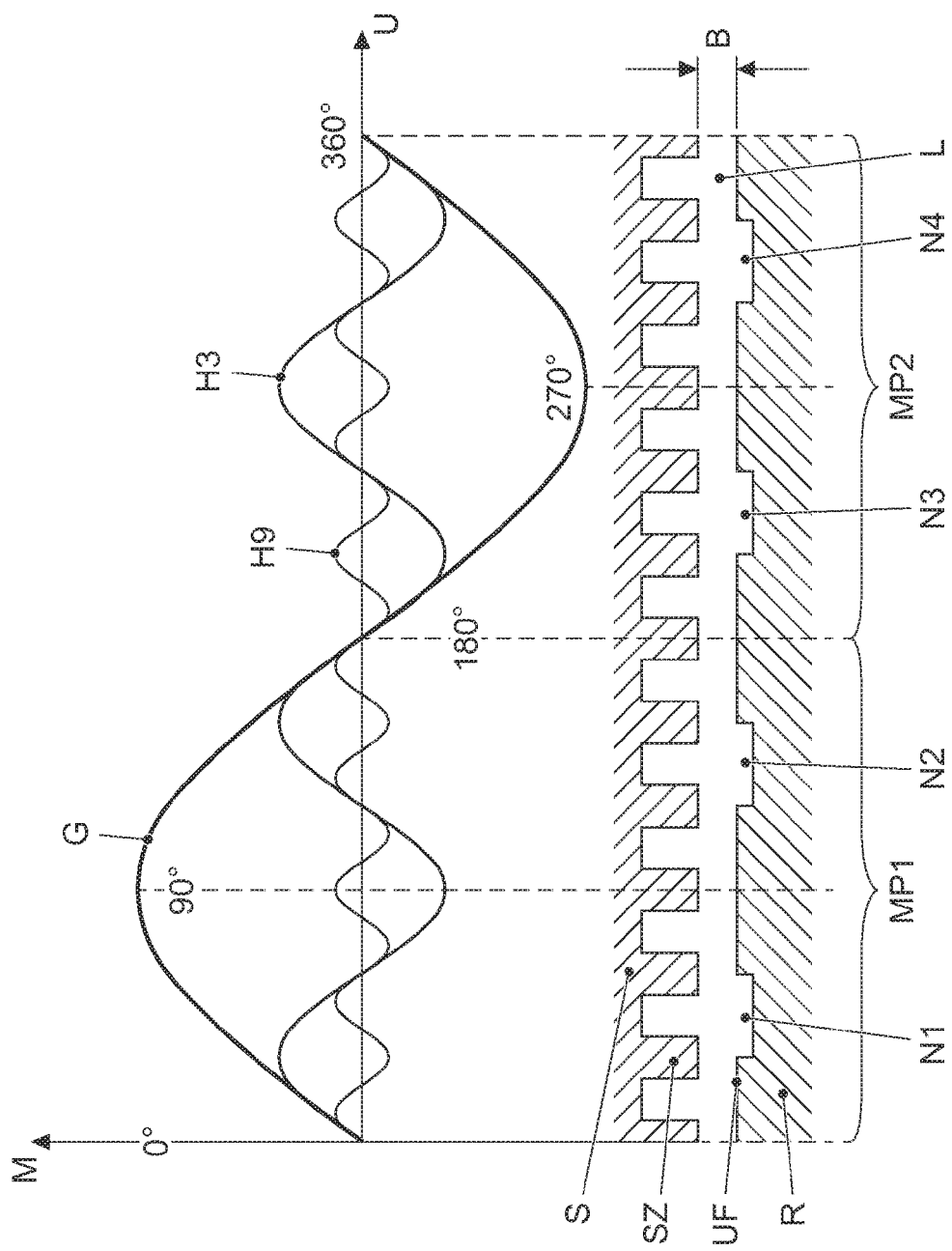
FIG. 1 shows a first exemplary embodiment of the invention.

FIG. 1 is a roughly schematic illustration of an exemplary profile of a basic function G, of a third harmonic H3 and of a ninth harmonic H9 of a profile of a magnetic field M along an extent of a circumferential coordinate U of a rotor R. The rotor R is represented in a roughly schematic fashion as an unwound cross section in the region of two adjacent opposing magnetic poles MP1 and MP2. In this context, a circumferential face of the rotor R, which faces a stator S, is denoted by the reference symbol UF. The stator S is also represented in a roughly schematic fashion as an unwound cross section in the region of the two adjacent opposing magnetic poles MP1 and MP2, wherein stator teeth SZ are also illustrated schematically. Between the circumferential face UF of the rotor R and the stator teeth SZ there is an air gap L with a basically uniform width B which is constant along the circumferential coordinate U.

Slot-like recesses N1, N2, N3, N4 which extent with their longitudinal extent perpendicularly with respect to the plane of the drawing are formed in the circumferential face UF of the rotor R. Transversely with respect to their longitudinal extent in the direction of the circumferential coordinate U, the slot-shaped recesses N1 to N4 extend in the region of the maximum values of the third harmonic H3 and of the ninth harmonic H9, but outside the region of the maximum values of the basic function G. For the sake of simpler orientation in the diagram, the electrical angle of the rotor R is plotted in angle degrees as a circumferential coordinate U, wherein each of the magnet poles MP1, MP2 extends over an electrical angle of 180°. One period of the basic function G with 360° therefore extends over both magnet poles MP1, MP2. The maximum values of the basic function G are located at an electrical angle of 90° and 270°. The maximum values of the third harmonic H3 are at an electrical angle of 30°, 90°, 150°, 210°, 270° and 330°. The maximum values of the ninth harmonic H9 are located at an electrical angle of 10°, 30°, 50°, 70°, 90°, 110°, 130°, 150°, 170°, 190°, 210°, 230°, 250°, 270°, 290°, 310°, 330° and 350°.

In the example shown in FIG. 1, four slot-like recesses N1 to N4 are provided as follows in order to satisfy the condition that the slot-like recesses N1 to N4 are to be located in the region of the maximum values of the third harmonic H3 and of the ninth harmonic H9 but outside the region of the maximum values of the basic function G:
- a first slot-like recess N1 extends from the first maximum value of the third harmonic H3 at an angle of 30° to the ninth zero crossing of the third harmonic H3 at an angle of 60°, wherein the zero crossing at 0° was also counted;
- a second slot-like recess N2 extends from the third zero crossing of the third harmonic H3 at an angle of 120° to the third maximum value of the third harmonic H3 at an angle of 150°;
- a third slot-like recess N3 extends from the fourth maximum value of the third harmonic H3 at an angle of 210° to the fifth zero crossing of the third harmonic H3 at an angle of 240°; and
- a fourth slot-like recess N4 extends from the sixth zero crossing of the third harmonic H3 at an angle of 300° to the sixth maximum value of the third harmonic H3 at an angle of 330°.

This configuration means that the specified slot-like recesses N1 to N4 on the circumferential face UF of the rotor R each extend from a maximum value of the ninth harmonic H9 to their next but one zero crossing, or from a zero crossing of the ninth harmonic H9 to their next but one maximum value.

In order to satisfy the condition that the slot-like recesses N1 to N4 are to be located outside the region of the maximum values of the basic function G, the slot-like recesses N1 to N4 in this example do not extend in the region of each of the maximum values of the third harmonic H3 and of the ninth harmonic H9 but rather only of selected maximum values.

In the illustration in FIG. 1, the slot-like recesses N1 to N4 are illustrated as rectangular slots. In the corresponding spatial configuration of the rotor R, the slot-shaped recesses N1 to N4 are formed by undercuts in the circumferential face UF of the rotor R, in which undercuts the radius of the rotor R is reduced suddenly. The slot-like recesses N1 to N4 can optionally also be configured differently from this illustration, for example with rounded undercuts, continuous transitions with the circumferential face UF of the rotor R, or with a circular-section-shaped cross section or the like.

Figure 2:
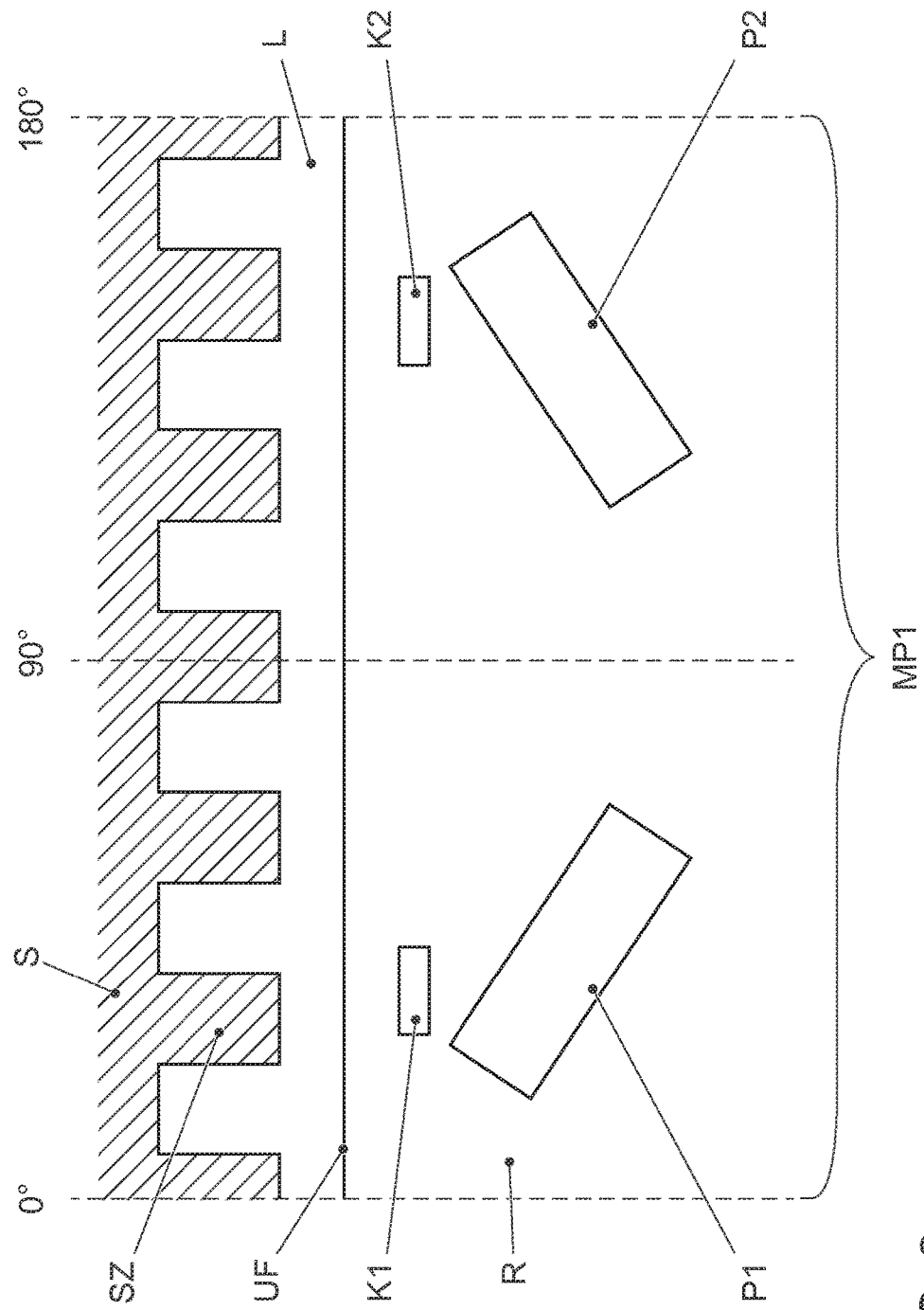
FIG. 2 shows a second exemplary embodiment of the invention as a refinement of the first exemplary embodiment according to FIG. 1.

FIG. 2 shows, in a refinement of the exemplary embodiment according to FIG. 1, a second exemplary embodiment of the invention in which, instead of the slots N1, N2, N3, N4 described above, cavities K1, K2 are arranged in the rotor R underneath the circumferential face UF. By way of simplification, just one magnet pole MP1 is represented, which is embodied with two permanent magnets P1 and P2 which are "buried" in the rotor and each of which is accommodated in a separate magnet pocket. The position, dimensions and configuration or contour of the cavities K1, K2 can be determined and optimized by means of simple trials and simulation calculations. In the exemplary embodiment shown, the cavities K1, K2 are arranged between the permanent magnets P1 and P2 and the circumferential face UF in the vicinity of a corner, tilted in the direction of the circumferential face UF, of the permanent magnets P1 and P2. Other configurations and positions are possible depending on requirements.

Figure 3:
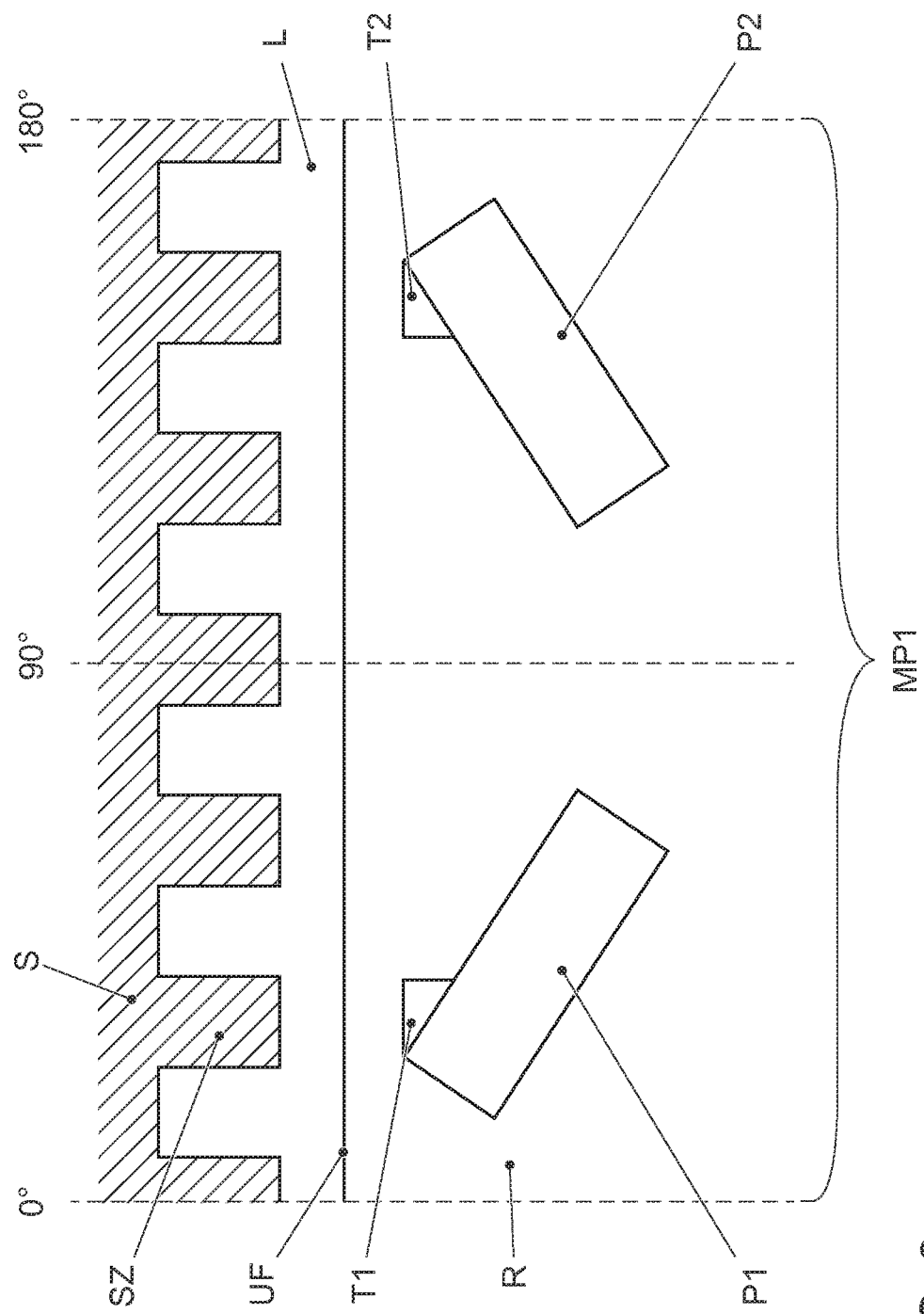
FIG. 3 shows a third exemplary embodiment of the invention as a further refinement of the first exemplary embodiment according to FIG. 1.

FIG. 3 shows, in a further refinement of the exemplary embodiment according to FIG. 1, a third exemplary embodiment of the invention in which, instead of the slots N1, N2, N3, N4 described above, pockets T1, T2 are arranged in the rotor R underneath the circumferential face UF. For the sake of simplification, only the magnet pole MP1 is represented again. The pockets are formed in to walls of the magnet pockets for the permanent magnets P1 and P2. In the exemplary embodiment shown, the pockets T1, T2 are arranged between the permanent magnets P1 and P2 and the circumferential face UF subsequent to the corner, tilted in the direction at the circumferential face UF of the magnet pockets for the permanent magnets P1 and P2. Other configurations and positions are also possible here depending on requirements.

LIST OF REFERENCE SYMBOLS

B Width of L
G Basic function
H3 Third harmonic
H9 Ninth harmonic
K1 First cavity
K2 Second cavity
L Air gap
M Magnetic field
MP1 Magnet pole
MP2 Magnet pole
N1 First slot-like recess
N2 Second slot-like recess
N3 Third slot-like recess
N4 Fourth slot-like recess
P1 First permanent magnet
P2 Second permanent magnet
R Rotor
S Stator
SZ Stator teeth
T1 First pocket
T2 Second pocket
U Circumferential coordinate
UF Circumferential face

The invention claimed is:

1. A rotor for a three-phase permanent-magnet-excited synchronous machine, the synchronous machine having a stator, the rotor comprising:
   a circumferential face facing the stator;
   a plurality of magnetic poles disposed to induce a voltage in the stator upon rotation of the rotor;
   a magnetic field generated by said magnetic poles having a field strength, along a circumferential coordinate of the rotor, with a profile formed from a superimposition of a sinusoidal basic function and sinusoidal harmonics of the basic function, the sinusoidal basic function having a period corresponding to a pole pitch of the rotor;
   a plurality of features selected from the group consisting of slot recesses formed in said circumferential face of the rotor and cavities formed below said circumferential face of the rotor, said features having a longitudinal extent following an axial extent of the pole pitch of the rotor and extending transversely with respect to their longitudinal extent along the circumferential coordinate in a region of the maximum values of the third harmonic and outside a region of the maximum values of the basic function.

2. The rotor according to claim 1, wherein said slot recesses and/or cavities which, in the longitudinal extent thereof, follow the axial extent of the pole pitch of the rotor in the circumferential face facing the stator, extend transversely with respect to their longitudinal extent along the circumferential coordinate in the region of the maximum values of at least the third harmonic and additionally in a region of the maximum values of a harmonic selected from the group consisting of a ninth harmonic, a fifteenth harmonic, and a twenty-first harmonic, and outside the region of the maximum values of the basic function.

3. The rotor according to claim 1, wherein said circumferential face of the rotor is configured such that an air gap between said circumferential face and an opposite-lying face of the stator is formed substantially constant along the circumferential coordinate of the rotor outside said slot recesses.

4. The rotor according to claim 1, wherein said cavities that follow the axial extent of the pole pitch of the rotor underneath said circumferential face are cavities that are substantially completely closed off transversely with respect to a longitudinal extent thereof.

5. The rotor according to claim 1, characterized in that the cavities which in their longitudinal extent follow the axial extent of the pole pitch of the rotor are slot-shaped pockets formed in a wall of at least one magnet pocket of the rotor under said circumferential face facing the stator.

6. A three-phase permanent magnet-excited synchronous machine, comprising a rotor according to claim 1.

7. A hybrid drive, comprising a three-phase permanent-magnet-excited synchronous machine having a stator and a rotor according to claim 1.

8. The hybrid drive according to claim 7, configured for a vehicle.

* * * * *